United States Patent [19]

Friedman

[11] 4,222,493
[45] Sep. 16, 1980

[54] COOKWARE

[76] Inventor: Conchetta Friedman, 2211 W. Morrow Dr., Phoenix, Ariz. 85027

[21] Appl. No.: 681,384

[22] Filed: Apr. 29, 1976

[51] Int. Cl.² .............................................. A47J 27/60
[52] U.S. Cl. ......................................................... 220/8
[58] Field of Search ............... 220/8; 73/429; 285/302

[56] References Cited

U.S. PATENT DOCUMENTS

| 375,498 | 12/1887 | McGuire | 220/8 |
| 561,167 | 6/1896 | Jennings | 220/8 |
| 735,951 | 8/1903 | Darsie | 73/429 |
| 883,652 | 3/1908 | Lenschow | 220/94 R |
| 991,322 | 5/1911 | Kimball | 73/429 |
| 2,438,434 | 3/1948 | Friedman | 220/8 |

FOREIGN PATENT DOCUMENTS 465864  5/1937  United Kingdom ........................ 220/8

Primary Examiner—George E. Lowrance
Attorney, Agent, or Firm—Farkas, Robert D.

[57] ABSTRACT

Cookware that is especially constructed such that a basic unit is adapted to be built upward thereby making a deeper pot or the like.

6 Claims, 7 Drawing Figures

U.S. Patent  Sep. 16, 1980  4,222,493
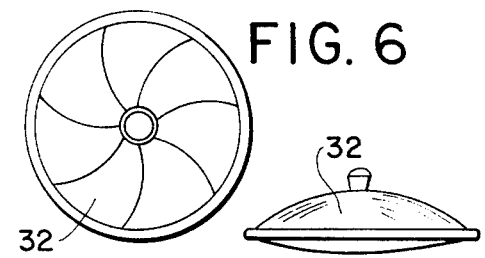
FIG. 6
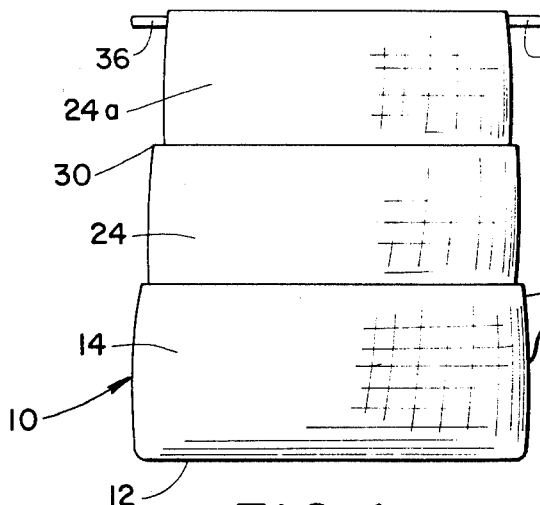
FIG. 1
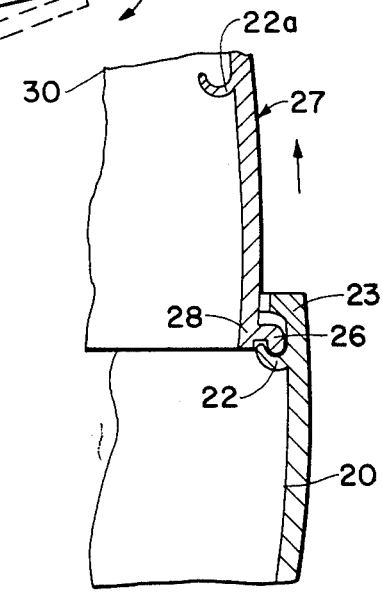
FIG. 7
FIG. 3
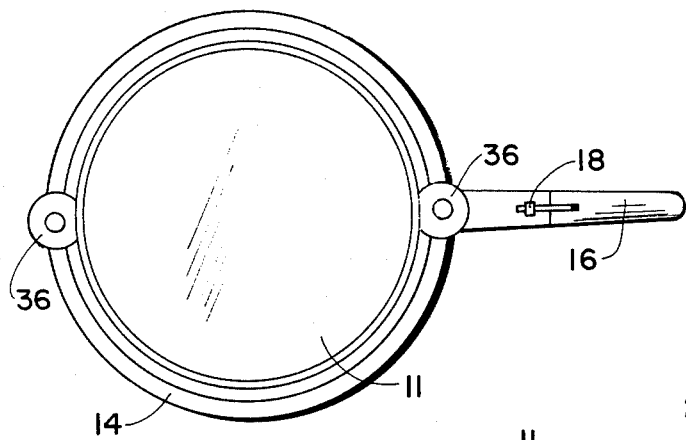
FIG. 2
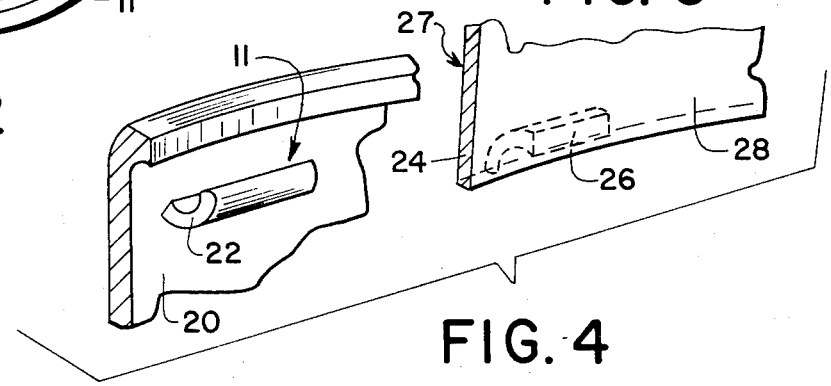
FIG. 4
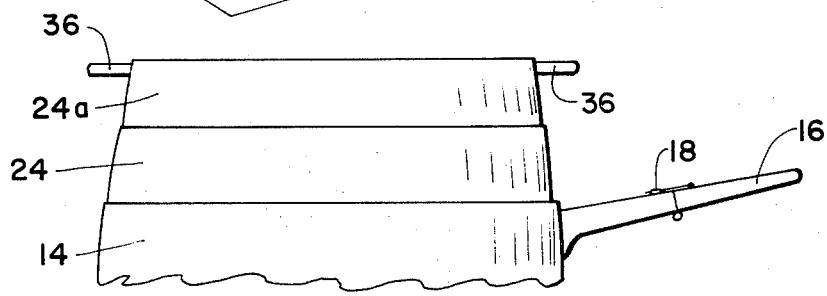
FIG. 5

COOKWARE

BACKGROUND OF THE INVENTION

This invention relates to cookware; more particularly to a basic unit of wookware that is adapted to receive in releasable engagement one or more sleeves thereby increasing the depth of the basic unit.

The prior art teaches a variety of cookware that include interchangable or movable parts, for example, as disclosed in U.S. Pat. Nos. 515,457; 561,167; 632,612; 872,837; 994,520; 1,607,095; 2,541,265; 3,489,267; and others. All of the foregoing are, however, either telescopically collapsisble or collapsible in another fashion, and do not contemplate increasing the depth of a basic unit but rather building that basic unit.

SUMMARY OF THE INVENTION

It is accordingly an object of the instant invention to provide for a new and novel cooking utensil.

It is another object to provide for the same at relatively little cost thereby making it generally available.

It is a further object to provide for cooking ware wherein a basic unit is provided that is adapteable to be built upon.

These and other objects and advantages of the invention will become more apparent from the following detailed disclosure and claims and by reference to the accompanying drawings, in which:

FIG. 1 is a side view;
FIG. 2 is a plan view;
FIG. 3 is a partial cross section view of a portion of the apparatus shown in FIG. 1;
FIG. 4 is a fragmentary perspective view;
FIG. 5 is a side elevational view;
FIG. 6 is a plan view of the cover means; and
FIG. 7 is a side view of the cover means.

Broadly speaking, the instant invention includes the provision of a vessel adapted to increase in depth, comprising a primary vessel having a base portion, side walls and an open mouth area defined by a rim therearound, the primary vessel having a predetermined internal diameter defined by an internal wall, the internal wall including a first upwardly extending arcuate flange depending therefrom, at least one open ended walled sleeve member having an external diameter smaller than the internal diameter, the sleeve having an external surface including a first downwardly extending arcuate flange depending therefrom, the two flanges adapted to releasably engage whereby the sleeve is supported by the primary vessel.

DETAILED DISCLOSURE

Referring more particularly to the drawing, there is shown a cooking vessel 10 that includes a base portion 12, side walls 14 and preferably handle means 16. The handle means 16, attached to side walls 14, are preferably of the break away variety that is adapted to fold downward cut of a horizontal plane towards the vessel 10, this may be accomplished by suitable hinge-lock means 18 disposed on the handle 16. The main vessel 10 has a predetermined internal dismeter and an internal wall 20 that includes a U shaped channel or arcuate flanged portion 22 depending therefrom. The member 22 is preferably disposed completely about the internal wall 20 of the main or primary vessel 10. Where the vessel 10 is cylindrical there will be an annular member 22 therein. The instant cookware is built upon by engaging one or more (at least one) cooperative sleeves 24 that are preferably open at both ends, though only one end may be open, for instance where a double boiler is desired. The external diameter of the succeeding sleeve 24 will be smaller than the internal diameter of the main vessel 10. Whereas preferably adjacent the open mouth 11 or top rim area 23 of the main vessel 10 there was disposed the member 22, the sleeve 24 will carry its similar member 26 on its outer wall 27 and preferably adjacent the base 28 thereof. The member 26 is downwardly depending, that is opposite and complimentary to upwardly depending member 22 so that the two (22, 26) may engage each other frictionally when sleeve 24 is inserted into the open mouth 11 of vessel 10; the two members 22, 26 actually interengage by a revolving of the sleeve 24 in the vessel 10 until such time that cooperation and contact is complete.

The internal wall of the sleeve 24, adjacent its top rim 30 may then also define a second member 22a, that is substantially the same as member 22. A second sleeve 24a that is similar to sleeve 24, but has an external diameter smaller than the internal diameter of sleeve 24 is adapted to engage sleeve 24 in the same manner and by the same mechanism that the latter engaged the vessle 10. Sleeve 24a will have a member (26a not shown) that is similar to and disposed as is member 26 for engagement with member 22a, and so on, with each succeedingly smaller sleeve. The uppermost sleeve 24a may be adapted with a pair of handles 36, if desired. Cover means 32 may be provided, that is collapsible by folding inward, or the like.

Since it is obvious that numerous changes and modifications can be made in the above-described details without departing from the spirit and nature of the invention, it is to be understood that all such changes and modifications are included within the scope of the invention.

I claim:

1. A vessel adapted to increase in depth, comprising a primary vessel having a base portion, side walls and an open mouth area defined by a rim there around, said side walls disposed forming a circle, said primary vessel having a predetermined internal diameter defined by a circular internal wall, said circular internal wall including a first upwardly extending arcuate flange depending therefrom and defining a U shaped channel, said first upwardly extending arcuate flange extending partially along said circular internal wall, a second inwardly extending flange member projecting from said internal wall and disposed above said U shaped channel, at least one open ended walled sleeve member having an external surface diametrically smaller than said internal diameter, said external surface disposed forming a circular surface, said external surface including a first downwardly extending arcuate flange depending therefrom, said first downwardly extending arcuate flange extending partially along said external surface, said two flanges adapted to releasably engage one another upon the relative rotation of said primary vessel and said sleeve to each other, whereby said sleeve is supported by said primary vessel.

2. The vessel as defined in claim 1 wherein said first upwardly extending glange is disposed adjacent said open mouth.

3. The vessel as defined in claim 1 wherein said first downwardly extending flange is disposed adjacent the open end of said sleeve.

4. The vessel as defined in claim 1 wherein said primary vessel includes substantially horizontally extending hinged handle means adapted to fold downward.

5. The vessel as defined in claim 1 wherein said sleeve includes an inner surface, said surface including a second upwardly extending arcuate flange depending therefrom.

6. The vessel as defined in claim 5 additionally including a plurality of open ended sleeves each having an external diameter smaller than the internal diameter of the preceeding sleeve and each sleeve including a first and second member.

* * * * *